(12) United States Patent
Wong

(10) Patent No.: US 7,747,795 B2
(45) Date of Patent: Jun. 29, 2010

(54) METHOD AND SYSTEM FOR RATE ADAPTATION

(75) Inventor: David Wong, Campbell, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 12/213,832

(22) Filed: Jun. 25, 2008

(65) Prior Publication Data

US 2008/0270646 A1    Oct. 30, 2008

Related U.S. Application Data

(62) Division of application No. 10/180,509, filed on Jun. 27, 2002, now Pat. No. 7,409,474.

(51) Int. Cl.
G06F 3/00     (2006.01)
G06F 1/12     (2006.01)
G06F 1/04     (2006.01)

(52) U.S. Cl. .............................. 710/58; 710/60; 710/61; 710/52; 710/29; 713/400; 713/600

(58) Field of Classification Search ....................... None
See application file for complete search history.

(56) References Cited

U.S. PATENT DOCUMENTS

| | | | |
|---|---|---|---|
| 6,295,563 B1 | 9/2001 | Whittaker | |
| 6,433,598 B1 | 8/2002 | Schultz | |
| 6,539,488 B1 | 3/2003 | Tota et al. | |
| 6,880,098 B1 | 4/2005 | Huntsman | |
| 6,888,819 B1 | 5/2005 | Mushkin et al. | |
| 6,990,598 B2 | 1/2006 | Sherburne, Jr. | |
| 2002/0114354 A1 | 8/2002 | Sinha et al. | |
| 2004/0158657 A1 | 8/2004 | Momtaz et al. | |

FOREIGN PATENT DOCUMENTS

| | | |
|---|---|---|
| EP | 0752796 | 1/1997 |
| EP | 0907300 | 4/1999 |

*Primary Examiner*—Alan Chen

(57) ABSTRACT

A media access controller to adapt a rate of an output signal to a rate of an output medium is provided. The media access controller includes a register configured to output data to an external device, said register comprising a first input configured to control an output of the register and a second input configured to control an input to said register. The media access controller also includes a receiver configured to accept a signal from an external clock over the output medium and to provide said external clock signal to said first input of said register. An internal clock in the media access controller is configured to provide an internal clock signal from said internal clock to said second input of said register.

17 Claims, 5 Drawing Sheets

METHOD AND SYSTEM FOR RATE ADAPTATION

RELATED APPLICATIONS

The present application is a divisional application of and claims priority under 35 U.S.C. §121 to U.S. Ser. No. 10/180,509, filed on Jun. 27, 2002, the subject matter of which is hereby incorporated by reference in full.

BACKGROUND OF THE INVENTION

1. Field of the Invention

This invention relates to systems and methods for adapting the output speed of a device to the speed of the output medium. More particularly, this invention relates to systems and methods for adapting the output rate of an Ethernet network device to the speed of the line to which it is connected.

2. Description of the Related Art

Over the last several years, the proliferation of the Internet has had a significant impact on many industries, especially the computer industry. The Internet has grown into an enormous network to which virtually any large or small computer network may be connected. In fact, it is now commonplace for the vast majority of people in free, industrialized nations to have access to the Internet, either through their business or work and/or through personal accounts. This connectivity has allowed many businesses, universities, governments, etc. to expand to provide their services via the Internet.

Most people or businesses receive their Internet access via an Internet Service Providers (ISPs). ISPs provide access to the Internet for their customers usually through membership subscriptions. ISPs make at least a portion of their income on service fees such as subscription fees, on-demand provisioning of services, etc. ISPs often regulate the amount of Internet bandwidth (i.e., data speed) that a customer is entitled.

Today's networks primarily support data services. However, new applications, such as network games, voice telephony and live video will elevate the data network infrastructure as an integral component of the next generation network. A typical home in the near future could have two phones, one or two personal computers and/or Personal Digital Assistants (PDA's) and general television sets. Applications will strain network bandwidth availability unless end-to-end quality of service (QOS) is available to guarantee real time voice and video quality as well as data integrity.

QOS can be affected by flow control issues and line mismatch that can cause delays in packet delivery and unintended congestion problems. For example, referring to FIG. 1, two devices are shown connected by a connection medium such as fiber, coaxial cable, twisted pair, etc. The network devices may be, for example, network switches, routers, hubs, etc. Device 1 includes a buffer 106a, a media access controller (MAC) 104a, and a physical interconnect (PHY) 102a. When the buffer of device 1 is full, the ingress rate control subsystem (e.g., ARL) of the device 1 MAC will send a PAUSE frame to prevent device 2 from sending additional frames. This protocol provides what is called back pressure to the traffic flow. In the meantime, device 2 may still be sending frames before the device 2 MAC receives the PAUSE frame. Device 1, therefore, will need to reserve enough buffer space to account for the line delay, which is based on the type of medium and the length of the line. Furthermore, each PHY and each device MII layer (not shown) may also add delay to the system. For example, a Reed-Solomon (R/S) interleaver may be included in the MII layer to interleave data packets and perform error correction. The R/S interleaver therefore adds delay to data packets traveling between the MAC and the PHY. This delay may be variable based on the size and type of data being interleaved.

Rate mismatch may occur especially when a VDSL PHY is connected to an Ethernet port. As an attempt to solve rate adaptation issues, some network device implementations use a buffer in the PHY to account for the rate mismatch. For example, referring to FIG. 2, shown is a network device which includes a buffer 106, a MAC 104 and a PHY 102. In between the PHY 102 and the MAC 104 in the physical layer are an input buffer 108a and an output buffer 108b. The input buffer 108a can account for the rate mismatch in outputting data from the PHY 102 to the medium, and the output buffer 108b can account for the rate mismatch between the PHY 102 and the MAC 104. In this proposed scenario, when the input buffer 108a is becoming full, a carrier sense (CRS) signal may be sent to the MAC 104 to defer transmission to the input buffer 108a. When a carrier sense (CRS) signal is asserted, the output buffer 108b can still continue to empty the buffer. Of course, in this scenario, the MII must be working in half duplex mode. However, problems may occur when there is an actual collision. When there is an actual collision, the MAC will back off sending packets, and part of the packet that is currently being sent becomes a fragment. In the meantime, the packet transmitted by the buffer is anticipated to be a fragment and gets dumped by the MAC. When the MAC dumps this packet, the packet will be lost since the buffer has not backed off and resent the packet. PHY to PHY backpressure is also needed (as well as buffer back-off), if the switch is rate controlling the port. Since in this mode the PAUSE frame is not available, the only mode of operation to avoid a subsequent collision is through jamming of the line.

Jamming is intended to cause the colliding stations to reschedule their next transmission attempts at different intervals in order to avoid subsequent collisions. Note that the jamming will have to pass through the buffer in the PHY, and there will be added latency caused by the buffer. To prevent large numbers of packet losses, a larger buffer must be used. However, a large buffer creates even larger latency. Additional control between the PHY and the MAC might be required.

In view of the problems described above, a solution is desired for adapting to the line rate and accounting for line delay and delays in the Mil layer which does not include PHY buffers. Accordingly, there is a need for new systems and methods for rate adaptation in a data network.

SUMMARY OF THE INVENTION

According to one embodiment of the invention, provided is a media access controller, which includes an output buffer and a clock controller. The output buffer includes a first and second clock input. The first clock is configured to control data input into the buffer, and the second clock is configured to control data output from the buffer. The clock controller is coupled to the output buffer and configured to regulate a first clock signal input into the first clock input to control the data input into the buffer.

According to another embodiment of the invention, provided is a method of adapting a rate of an output signal to a rate of an output medium. The method includes providing a media access controller inputting an external clock signal into the media access controller, providing a register at an output of the media access controller, providing the external clock signal to a first input of the register, and providing a clock signal to a second input of the register.

According to another embodiment of the invention, provided is a network device. The network device includes a media access controller, a physical interconnect, an output buffer and a clock controller unit. The output buffer is coupled with an output of the media access controller and an input of the physical interconnect. The clock controller unit is coupled with the output buffer, and is configured to regulate a first clock signal being input to the first clock input in order to control the data input into the buffer.

BRIEF DESCRIPTION OF THE DRAWINGS

The objects and features of the invention will be more readily understood with reference to the following description and the attached drawings, wherein.

DETAILED DESCRIPTION OF THE PREFERRED EMBODIMENTS

The present invention provides rate adaptation to virtually any line speed and accounts for MII layer delays and line delays.

The following exemplary configuration is discussed in terms of an Ethernet switch for a VDSL (Very High Rate Bit-Rate DSL) application. Although certain aspects of the configuration may be specific to VDSL, the invention is not meant to be limited as such. One having ordinary skill in the art will readily understand that the present invention may be applicable to many other network device configurations.

Figure 1:
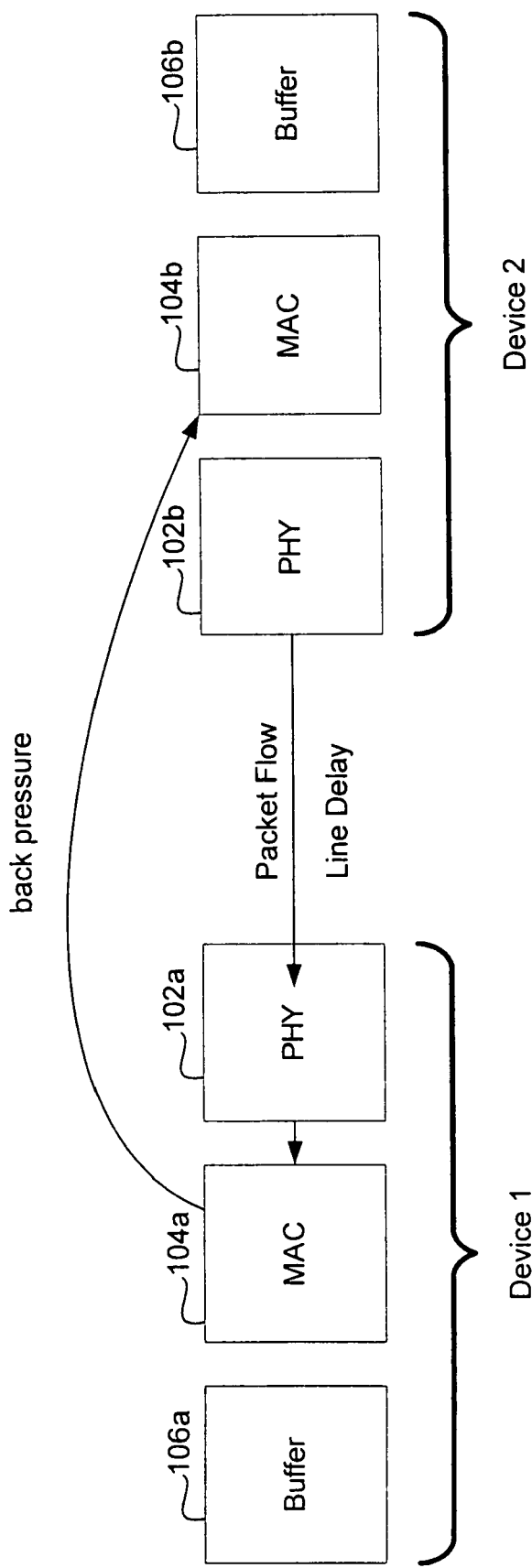
FIG. 1 is a block diagram of a network including two network devices illustrating back pressure and line delays.
Figure 2:
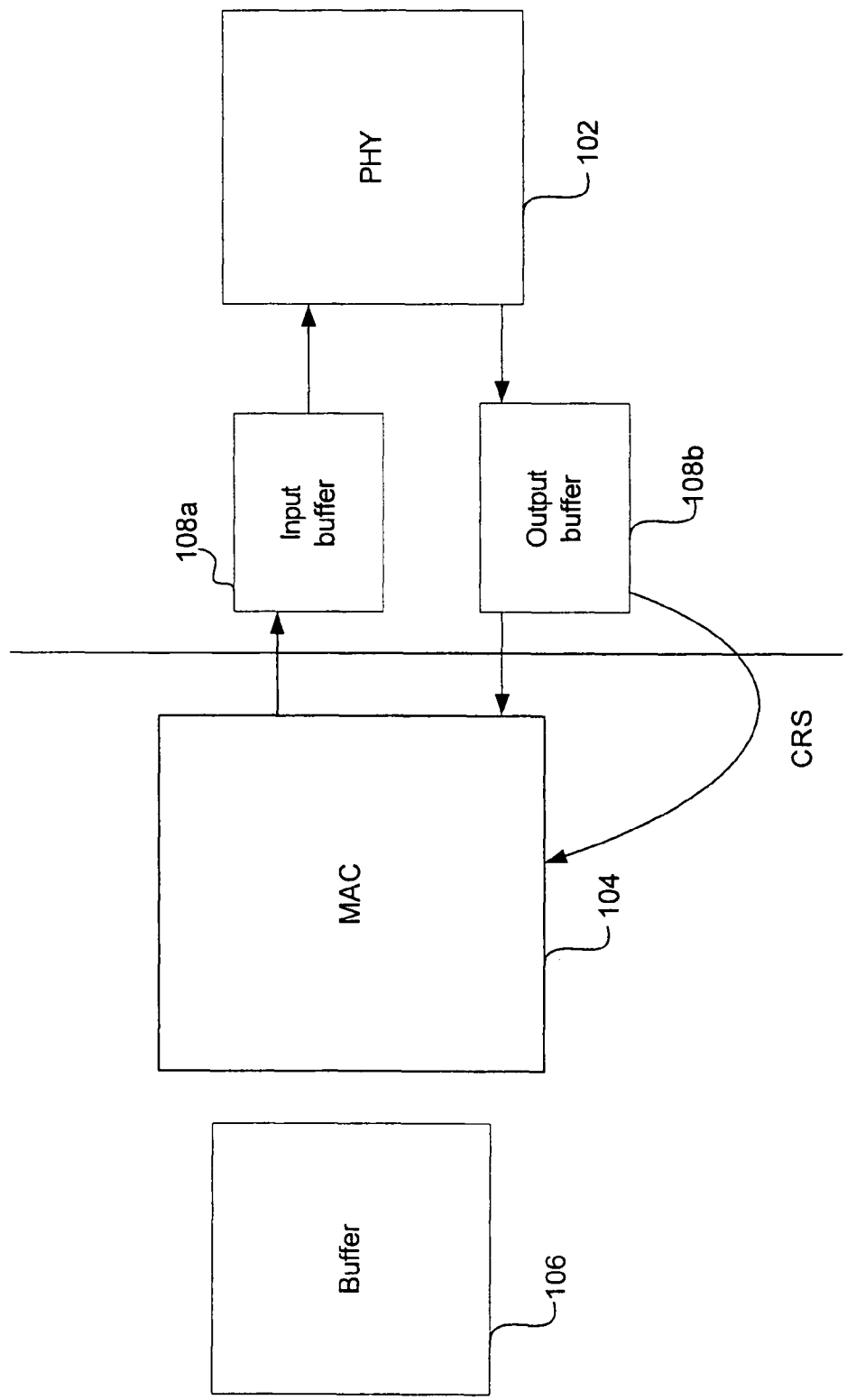
FIG. 2 is a block diagram of a network device which includes a PHY buffer.
Figure 3:
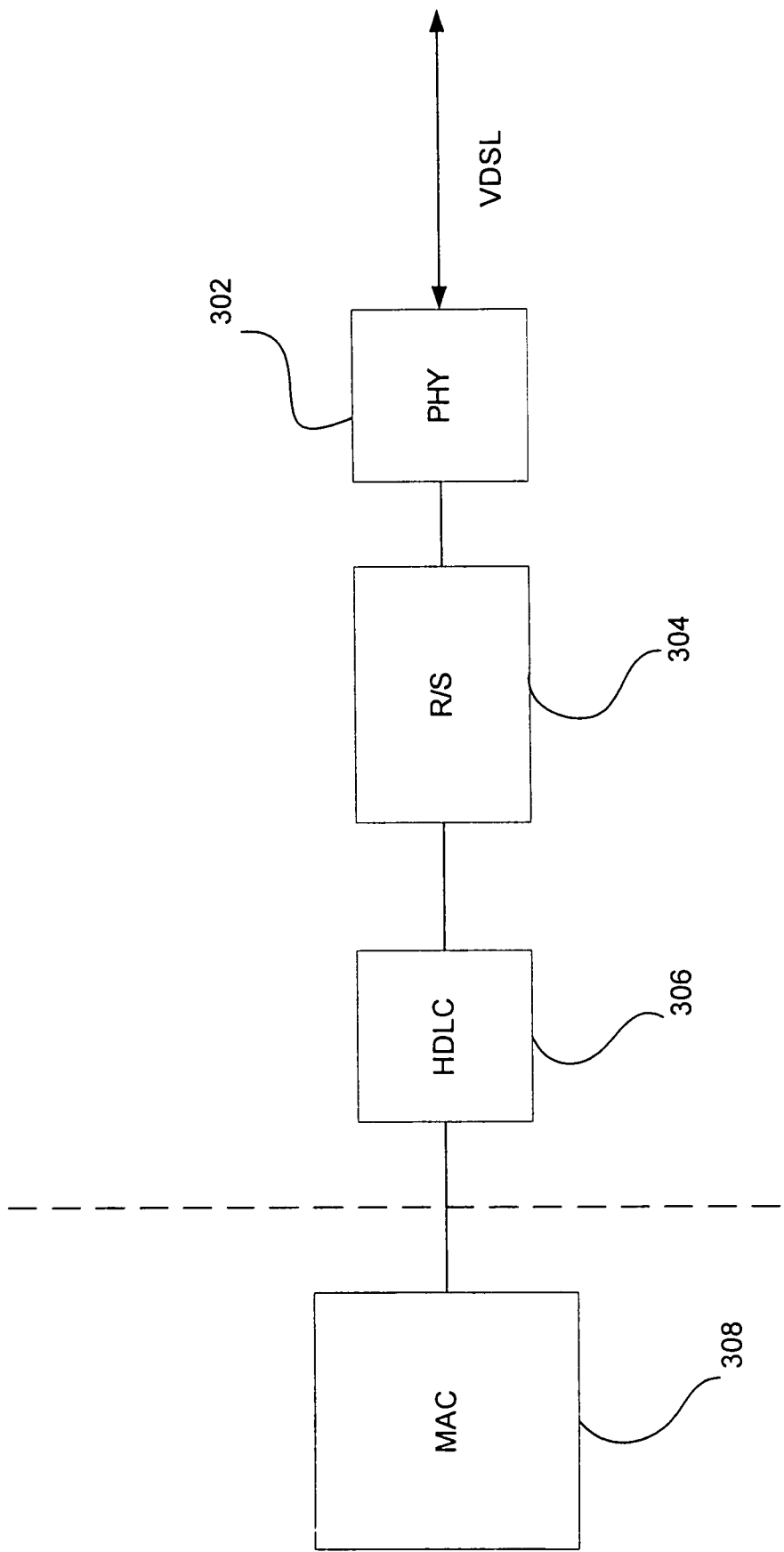
FIG. 3 is a block diagram of a network device supporting rate adaptation in accordance with an embodiment of the present invention.

FIG. 3 is a block diagram of a portion of a network device such as an Ethernet switch. The network device may include a PHY 302, an R/S interleaver 304, a high-level data link controller (HDLC) 306, and a MAC 308. The HDLC 306 and the R/S interleaver 304 are generally referred to as being part of the MII layer. PHY 302 may be, for example, a 100-Base-T PHY for VDSL over a phone line. Accordingly, PHY 302 may use quadrature amplitude modulation (QAM) or DMT to modulate the line. Therefore, an HDLC is required in order to encapsulate the data packets into a format compatible with VDSL for Ethernet.

Figure 4:
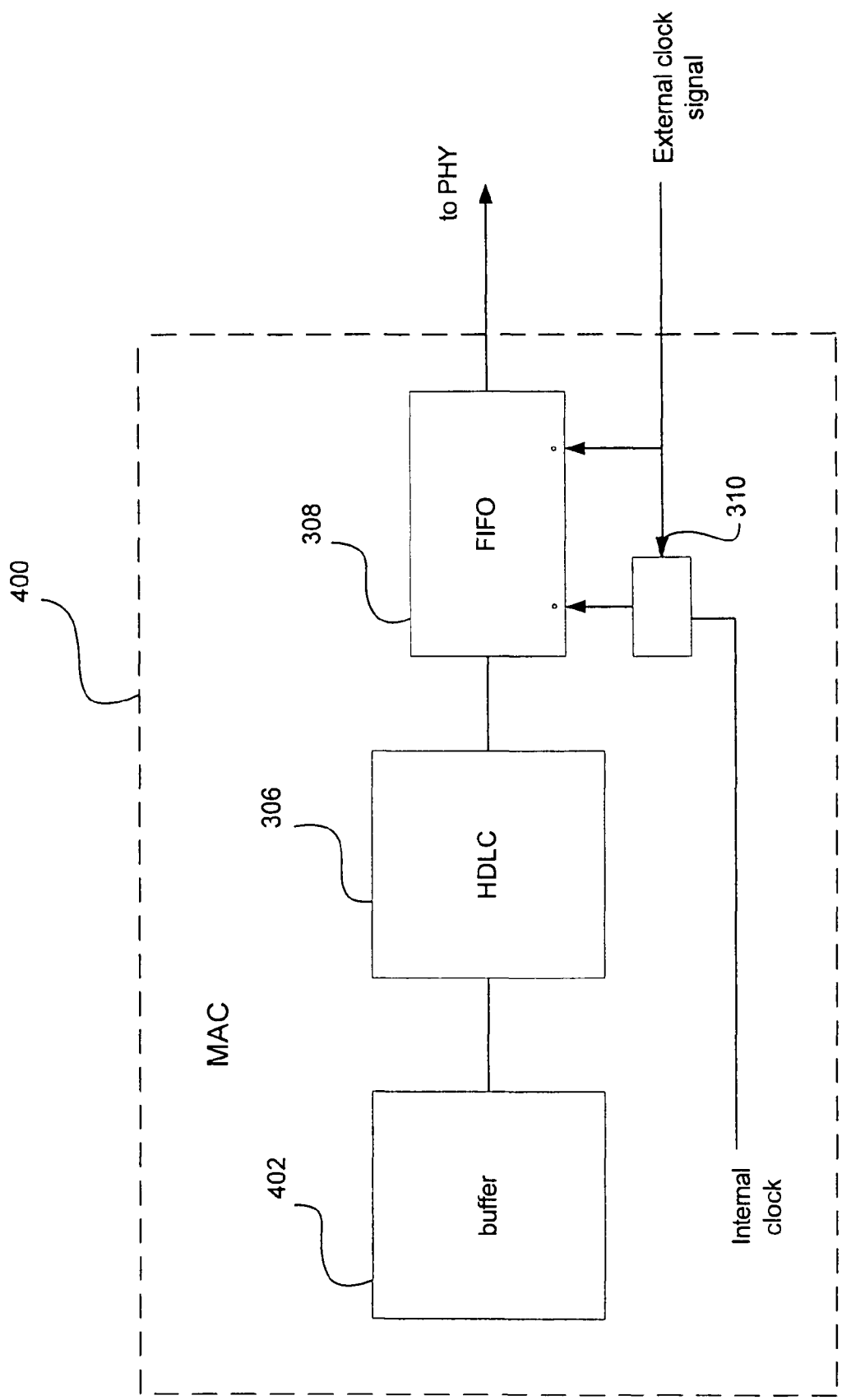
FIG. 4 is a block diagram of a MAC according to an embodiment of the present invention.

The R/S interleaver interleaves the data by spreading out the data bits to reduce the impact of hit errors. Furthermore, the R/S interleaver can perform error correction. Accordingly, the R/S interleaver may cause delays in data output based on the type of data (i.e., video versus data). Rather than buffering the data at the HDLC 306, the HDLC 306 may be integrated into the MAC 308 as shown in FIG. 4. Alternatively, the network device may be configured so that the HDLC 306 is not integrated within and the MAC 308.

FIG. 4 is a block diagram of a MAC according to an embodiment of the present invention. MAC 400 includes a buffer 402, an HDLC 306 and a First-in-First-out register (FIFO) 308. Buffer 402 may be a common or shared memory pool and is configured to buffer data packets during switching or routing. MAC 400 performs well-known switching functions and may be coupled with other subsystems of the switch, such as an ARL, a CPU, etc. There may be one MAC per PHY, or one MAC for many PHYs in a device. As data packets are routed to a PHY (or port), data packets are first encapsulated by HDLC 306. That is, an HDLC header and footer may be added to the packet, bit stuffing may be performed and other steps are performed to encapsulate the data packet in the format for high-level data link control. Once encapsulated, the data packet may be delivered to the PHY (not shown).

FIFO 308 is provided between the HDLC 306 and the output of the MAC. The FIFO 308 receives two input clocks, a first input clock (internal clock) for controlling input into the FIFO 308 and a second input clock (external clock) for controlling output from the FIFO 308. The first input clock (internal clock) may be a high-speed clock which is used to establish the rate at which the packets are transferred out of buffer 402 into FIFO 308. The second input clock (external clock) connects to each port to control the rate of forwarding of the packets out of FIFO 308 to the PHY. In order to match the speed of the output from the HDLC 306 with the PHY the input clock (internal clock) is controlled to match the speed of the output clock (external clock). For example, VDSL line speeds may vary from 1 megabyte per second (Mbps) to 25 Mbps. Assuming that the internal clock speed of a switch chip is at least 166 megahertz, the internal clock of the MAC 400 is assumed to be much faster than the external clock. Therefore, data will always be accepted into FIFO 308 faster than data can be output from FIFO 308. Instead of buffering the data as is commonly done, the internal clock input into FIFO 308 is controlled to match the speed of the line. Therefore, a clock control unit 310 is added in line with the internal clock to the first clock input of FIFO 308. The clock control unit 310 may include a watermark device, a state control device, or other means for regulating the internal clock input to the first clock input of FIFO 308. It is preferred that the clock control unit operates as fast as possible in order to improve quality of service.

Based on the FIFO size, as FIFO 308 fills up to a predetermined level, the clock control unit 310 may be configured to stop the internal clock signal from being input into the first clock input of FIFO 308. However, the external clock signal is still input into the second clock input of FIFO 308 such that the output from the MAC continues at the rate of the external clock signal. Namely, MAC 400 may be configured so that, when the FIFO reaches a predetermined level (threshold), clock control unit 310 may substitute the internal clock signal with the external clock signal. Thus, the external clock signal will take over the input rate of the packets into FIFO 308 so that the input speed of the packets into FIFO 308 will match the line speed. In this mode of operation, the external clock signal will simultaneously control both the input rate into and the output rate out of FIFO 308. The external clock signal may be taken directly off the board (PCB), from the PHY, or from the line in order to match the output speed of MAC 400 with the line speed exactly, or it may be desired to match the external clock with the output speed of a R/S interleaver (or the MII layer). When the packets within FIFO 308 falls below a predetermined level, the clock control unit 310 will switch control of the input rate from the external clock back to the internal clock so that the internal clock will resume control of the input of the packets to FIFO 308.

Thus, by substituting the input clock into FIFO 308 with the external clock, there is no need to provide a separate buffer in the MAC or in the HDLC 306 because reducing the rate of input into FIFO 308 to match line speed will prevent an overflow of the FIFO. Since the HDLC (or any parts of the MII layer before the R/S interleaver or before a delay causing subsystem) may be integrated into the MAC, the internal clock may be used to drive the data rather than the clock of the line. Accordingly, data may be driven faster than the clock of the line. However, if the internal clock signal is substituted with the external clock signal, the data will be outputted at the speed of the clock of the line (external clock signal), and the speed will be matched perfectly.

One having ordinary skill in the art will readily understand that the external clock may be set to any speed, and may also be variable. Therefore, by dynamically starting and stopping (i.e., substituting or swapping out) the internal clock to FIFO 308, the output of the MAC 400 may be matched with the line speed or any desired data rate.

Figure 5:
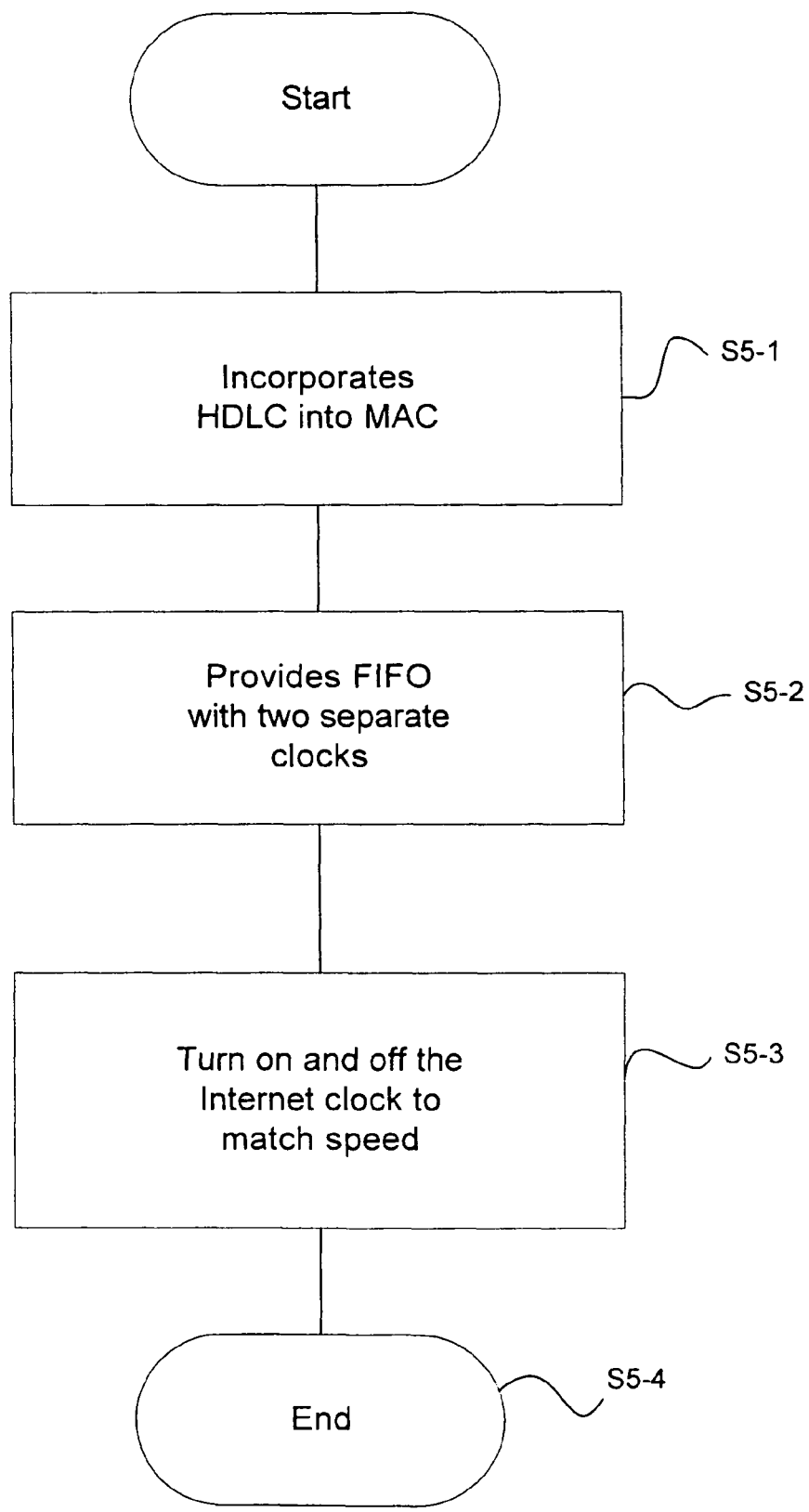
FIG. 5 is a flowchart of a method for aggregated rate control according to an embodiment of the present invention.

FIG. 5 is a flowchart of a method for rate adaptation according to an embodiment of the present invention. At Step S5-1, within a network device such as a switch, certain devices or subsystems may delay the output of data. For example, as described above within a DSLAM switch for a VDSL, there may be a delay between an HDLC and the PHY. There may be a speed mismatch between an HDLC and the R/S interleaver. According to the present invention, the HDLC may be incorporated into the MAC. Next, at step S5-2, a FIFO is provided at the output of the MAC having two separate input clocks: a first input clock for controlling data packets input into the FIFO and a second input clock for controlling the output from the FIFO. The first input clock may receive the internal clock, while the second input clock may receive an external clock. The external clock may be matched with the line or matched with the subsystems of the device (e.g., R/S interleaver), as desired. At Step S5-3, the internal clock or the first input clock is controlled in order to control input into the FIFO. Based on the FIFO size, the first input clock may be turned ON and OFF so that the FIFO does not overflow and so there are no packet drops. As described above, a clock control device such as a state control device, a watermark device, etc., may be placed in line with the first input clock signal to control the clock. The clock control unit may control the first input clock signal based on FIFO size and FIFO utilization. Accordingly, the clock control unit may be connected to the FIFO to receive this information. Alternatively or conjunctively, the clock control unit may be configured to directly receive the external clock signal. Thus, by the above configuration, the output speed of a network device may be matched with a line, or internal subsystems of the device may be matched with external subsystems, such as the transceivers or PHYs. Processing ends at step S5-4.

One having ordinary skill in the art will understand that a network device may be configured to perform the above-described method either in silicon, in discrete components, or in software. Accordingly, one will understand that the switching configurations described herein are merely exemplary. Although the invention has been described based upon these preferred embodiments, it would be apparent to those of skilled in the art that certain modifications, variations, and alternative constructions would be apparent, while remaining within the spirit and scope of the invention. For example, any network device may implement the configuration of the present invention. In order to determine the metes and bounds of the invention, therefore, reference should be made to the appended claims.

I claim:

1. A method of adapting a rate of an output signal to a rate of an output medium, said method comprising:

providing a media access controller comprising an internal clock;

inputting an external clock signal into said media access controller;

providing a register at an output of said media access controller for outputting data to an external device, said register comprising a first input configured to control an output of the register and a second input configured to control an input to said register;

providing said external clock signal to said first input of said register;

providing an internal clock signal from said internal clock to said second input of said register;

measuring a capacity of said register; and substituting said internal clock signal with said external clock signal when said capacity reaches a predetermined level such that said external clock signal is provided to both said first input and said second input of said register.

2. The method of claim 1, further comprising continuing said internal clock signal when said capacity falls below said predetermined level such that said internal clock signal is provided to said second input of said register and said external clock signal is provided to said first input of said register.

3. The method of claim 1, wherein providing a register comprises providing a FIFO as said register.

4. The method of claim 1, wherein inputting an external clock signal comprises matching said external clock with a speed of said external device.

5. The method of claim 1, further comprising matching the internal clock to match said external clock.

6. An apparatus to adapt a rate of an output signal to a rate of an output medium, said apparatus comprising:

a register configured to output data to an external device, said register comprising a first input configured to control an output of the register and a second input configured to control an input to said register;

a receiver configured to accept a signal from an external clock over the output medium and to provide said external clock signal to said first input of said register; and an internal clock configured to provide an internal clock signal from said internal clock to said second input of said register, wherein said register is further configured to measure a capacity of said register, and substitute said internal clock signal with said external clock signal when said capacity reaches a predetermined level such that said external clock signal is provided to both to said first input and to said second input of said register.

7. The apparatus of claim 6, wherein said register is further configured to use said internal clock signal when said capacity falls below said predetermined level such that said internal clock signal is provided to said second input of said register and said external clock signal is provided to said first input of said register.

8. The apparatus of claim 6, wherein said register comprises a FIFO.

9. The apparatus of claim 6, wherein said external clock is matched to a speed of said external device.

10. The apparatus of claim 6, wherein internal clock is further configured to:

receive said external clock signal, and match said external clock.

11. An apparatus for adapting a rate of an output signal to a rate of an output medium, said apparatus comprising:

register means for outputting data to an external device, said register means comprising first input means for controlling an output of the register and second input means for controlling an input to said register;

receiver means for accepting a signal from an external clock means over the output medium and for providing said external clock signal to said first input means of said register means; and an internal clock means for providing an internal clock signal from said internal clock to said second input of said register, wherein said register means is further configured to measure a capacity of said register means and to substitute said internal clock signal with said external clock signal when said capacity reaches a predetermined level such that said external clock signal is provided to both said first input means and said second input means of said register means.

12. The apparatus of claim 11, wherein said register means is further configured to use said internal clock signal when said capacity falls below said predetermined level such that said internal clock signal is provided to said second input means of said register means and said external clock signal is provided to said first input means of said register means.

13. The apparatus of recited in claim 11, wherein said register means comprises a FIFO.

14. The apparatus of recited in claim 11, wherein said external clock means is matched to a speed of said external device.

15. The apparatus of recited in claim 11, wherein internal clock means is further configured to receive said external clock signal, and match said external clock.

16. A computer readable medium having recorded and stored thereon instructions for adapting a rate of an output signal to a rate of an output medium that, when executed, perform the actions of:

providing a media access controller comprising an internal clock;

inputting an external clock signal into said media access controller;

providing a register at an output of said media access controller for outputting data to an external device, said register comprising a first input configured to control an output of the register and a second input configured to control an input to said register;

providing said external clock signal to said first input of said register;

providing an internal clock signal from said internal clock to said second input of said register;

measuring a capacity of said register; and substituting said internal clock signal with said external clock signal when said capacity reaches a predetermined level such that said external clock signal is provided to both said first input and said second input of said register.

17. The computer readable medium of claim 16 further comprising instructions that, when executed, perform the actions of continuing said internal clock signal when said capacity falls below said predetermined level such that said internal clock signal is provided to said second input of said register and said external clock signal is provided to said first input of said register.

* * * * *

UNITED STATES PATENT AND TRADEMARK OFFICE
CERTIFICATE OF CORRECTION

PATENT NO. : 7,747,795 B2  Page 1 of 1
APPLICATION NO. : 12/213832
DATED : June 29, 2010
INVENTOR(S) : David Wong It is certified that error appears in the above-identified patent and that said Letters Patent is hereby corrected as shown below:

In column 7, line 24, in claim 13, after "apparatus of" delete "recited in".

In column 7, line 26, in claim 14, after "apparatus of" delete "recited in".

In column 7, line 29, in claim 15, after "apparatus of" delete "recited in".

Signed and Sealed this

Fourteenth Day of December, 2010

David J. Kappos
*Director of the United States Patent and Trademark Office*